US012246992B2

(12) United States Patent
Fisher et al.

(10) Patent No.: US 12,246,992 B2
(45) Date of Patent: Mar. 11, 2025

(54) MODIFIED POLYMER DERIVED CERAMICS FOR ADDITIVE MANUFACTURING, ADDITIVE MANUFACTURING USING SAME, AND CERAMIC BODIES MANUFACTURED THEREBY

(71) Applicant: BWXT Advanced Technologies LLC, Lynchburg, VA (US)

(72) Inventors: Benjamin D. Fisher, Lynchburg, VA (US); John R. Salasin, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 1221 days.

(21) Appl. No.: 16/835,398

(22) Filed: Mar. 31, 2020

(65) Prior Publication Data

US 2020/0308064 A1    Oct. 1, 2020

Related U.S. Application Data

(60) Provisional application No. 62/827,372, filed on Apr. 1, 2019.

(51) Int. Cl.
| | |
|---|---|
| *C04B 35/589* | (2006.01) |
| *B33Y 70/10* | (2020.01) |
| *C04B 35/56* | (2006.01) |
| *C04B 35/58* | (2006.01) |
| *C04B 35/634* | (2006.01) |
| *C04B 35/638* | (2006.01) |
| *C04B 35/64* | (2006.01) |
| *G21C 1/02* | (2006.01) |
| *G21C 21/02* | (2006.01) |
| *B29C 64/135* | (2017.01) |
| *B29K 105/16* | (2006.01) |
| *B29K 509/02* | (2006.01) |
| *B33Y 10/00* | (2015.01) |

(52) U.S. Cl.
CPC ............ *C04B 35/589* (2013.01); *B33Y 70/10* (2020.01); *C04B 35/5615* (2013.01); *C04B 35/58014* (2013.01); *C04B 35/63448* (2013.01); *C04B 35/638* (2013.01); *C04B 35/64* (2013.01); *G21C 21/02* (2013.01); *B29C 64/135* (2017.08); *B29K 2105/16* (2013.01); *B29K 2509/02* (2013.01); *B33Y 10/00* (2014.12); *C04B 2235/3224* (2013.01); *C04B 2235/3826* (2013.01); *C04B 2235/3843* (2013.01); *C04B 2235/3873* (2013.01); *C04B 2235/3886* (2013.01); *C04B 2235/483* (2013.01); *C04B 2235/6026* (2013.01)

(58) Field of Classification Search
None
See application file for complete search history.

(56) References Cited

U.S. PATENT DOCUMENTS

| | | | |
|---|---|---|---|
| 4,159,259 A | 6/1979 | Yajima et al. | |
| 6,120,840 A * | 9/2000 | Paul | C04B 35/5622 428/704 |
| 8,119,057 B2 | 2/2012 | Fei et al. | |
| 9,302,945 B2 | 4/2016 | Findley | |
| 9,764,987 B2 | 9/2017 | Hill et al. | |
| 9,944,021 B2 | 4/2018 | Easter et al. | |
| 10,221,284 B2 | 3/2019 | Eckel | |
| 2003/0113447 A1 | 6/2003 | Sherwood et al. | |
| 2006/0039524 A1 * | 2/2006 | Feinroth | C04B 35/62897 376/409 |
| 2016/0221262 A1 | 8/2016 | Das et al. | |
| 2017/0008236 A1 | 1/2017 | Easter et al. | |
| 2018/0025797 A1 | 1/2018 | Van Rooyen et al. | |
| 2018/0148379 A1 | 5/2018 | Schaedler et al. | |

(Continued)

FOREIGN PATENT DOCUMENTS

| | | |
|---|---|---|
| CN | 106810215 A | 6/2017 |
| DE | 4110917 A1 | 10/1992 |

(Continued)

OTHER PUBLICATIONS

Diptanshu, "Indirect Additive Manufacturing of Ceramics", Texas A&M Univ., MS Thesis, Aug. 2018 (69 pages).
Morrison et al. "Feasibility Study of Solid Matrix Fuels for Space Power Reactors", Proceedings of Nuclear and Emerging Technologies for Space (NETS-2015), Paper 5095, Feb. 23-26, 2015, pp. 242-249.
International Search Report and Written Opinion issued in PCT/US2020/025950 on Jun. 15, 2020.
Diptanshu, "Indirect Additive Manufacturing of Ceramics", Thesis Submitted to the Office of Graduate and Professional Studies of Texas A&M University, Aug. 2018, 69 pgs.
Office Action issued on Jan. 18, 2023 in Canadian Application No. 3, 130,500.

(Continued)

*Primary Examiner* — Tanisha Diggs
(74) *Attorney, Agent, or Firm* — Morgan, Lewis & Bockius LLP

(57) ABSTRACT

Pre-ceramic particle solutions can prepared by a Coordinated-PDC process, a Direct-PDC process or a Coordinated-Direct-PDC process. The pre-ceramic particle solution includes a polymer selected from the group consisting of (i) an organic polymer including a metal or metalloid cation, (ii) a first organometallic polymer and (iii) a second organometallic polymer including a metal or metalloid cation different from a metal in the second organometallic polymer, a plurality of particles selected from the group consisting of (a) a ceramic fuel particle and (b) a moderator particle, a dispersant, and a polymerization initiator. The pre-ceramic particle solution can be supplied to an additive manufacturing process, such as digital light projection, and made into a structure (which is pre-ceramic particle green body) that can then be debinded to form a polymer-derived ceramic sintered body. In some embodiments, the polymer-derived ceramic sintered body is a component or structure for fission reactors.

26 Claims, 9 Drawing Sheets

(56) References Cited

U.S. PATENT DOCUMENTS

| | | | |
|---|---|---|---|
| 2019/0002353 | A1 | 1/2019 | Eckel et al. |
| 2020/0047288 | A1 | 2/2020 | Schiffres et al. |
| 2020/0049415 | A1 | 2/2020 | Schffres et al. |
| 2020/0353681 | A1 | 11/2020 | Fisher et al. |
| 2022/0134650 | A1 | 5/2022 | Salasin et al. |

FOREIGN PATENT DOCUMENTS

| | | | | |
|---|---|---|---|---|
| JP | S52-112700 | A | | 9/1977 |
| JP | 2015-168263 | A | | 9/2015 |
| JP | 2016-501139 | A | | 1/2016 |
| KR | 10-1324467 | B1 | | 11/2013 |
| KR | 10-1601948 | B1 | | 3/2016 |
| WO | 2014/074954 | A2 | | 5/2014 |
| WO | WO-2018031821 | A1 | * 2/2018 | .............. A61K 6/16 |
| WO | 2018/208155 | A1 | | 11/2018 |

OTHER PUBLICATIONS

Extended European Search Report issued on Nov. 24, 2022 in European Application No. 20782044.0.
Office Action issued on Aug. 11, 2023 in Canadian Application No. 3, 130,500.
Salasin et al., The effect of process parameters on the amorphous citrate sol-gel synthesis of Cu-doped Ca12Al14O33 Materialia, 4 (2018) 466-477.
Salasin et al., In-Situ Kinetic Investigation of Calcium Aluminate Formation, Ceramics 2018, 1(1), 175-197.
Barrett et al., Advanced LWR Nuclear Fuel Cladding System Development Trade-off Study, Idaho National Laboratory Light Water Reactor Sustainability Program (2012).
Thomas, 3-D printing of polymer-derived CMCs for next-generation turbine blade manufacture, American Ceramic Society Bulletin, vol. 96, No. 4 (2017) 28-30.
Eckel et al., Additive manufacturing of polymer-derived ceramics, Science, 2016, 351 (6268), 58-62.
Massih, Electronic transport in pure and doped UO2, Journal of Nuclear Materials, 497 (2017) 166-182.
Clark, Ion Irradiation Characterization Studies of MAX Phase Ceramics, Masters Thesis, University of Tennessee, 2015.
Demkowicz, The Advanced Gas Reactor Fuel Development and Qualification Program Overview, Presentation at Advanced Gas Reactor TRISO Fuels Program Review, Idaho Falls, ID, Jul. 18-19, 2017.
Office Action dated Jan. 16, 2024, issued in corresponding Japanese Patent Application No. 2021-560471.
Office Action dated Jul. 9, 2024 issued in corresponding Japanese Patent Application No. 2021-560471.
Office Action dated Jul. 5, 2024, issued in corresponding Korean Patent Application No. 10-2021-7035204.

* cited by examiner

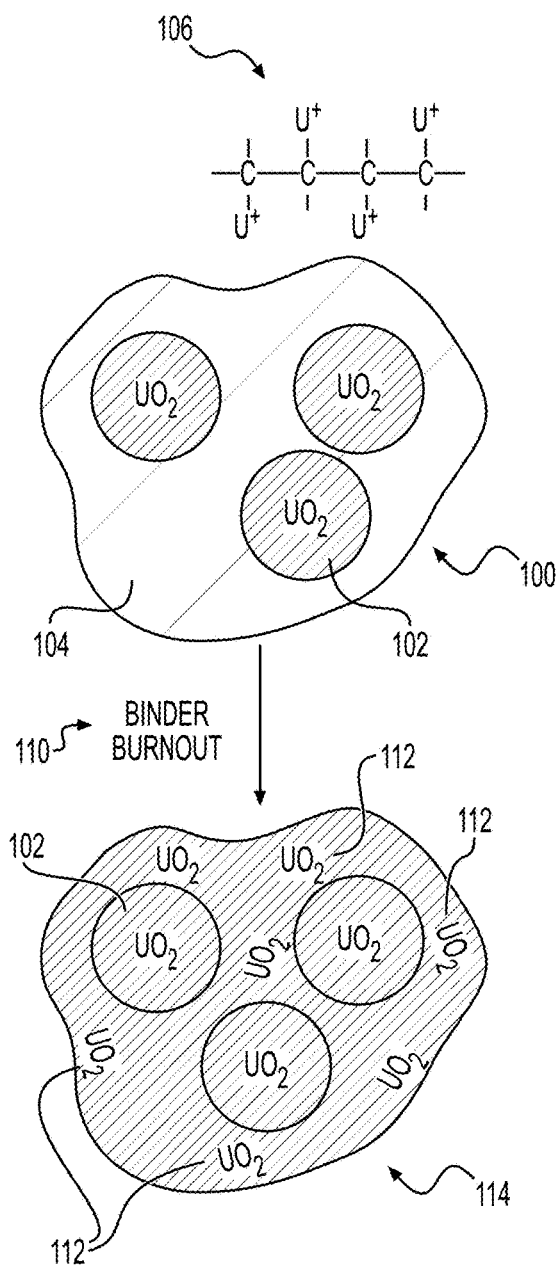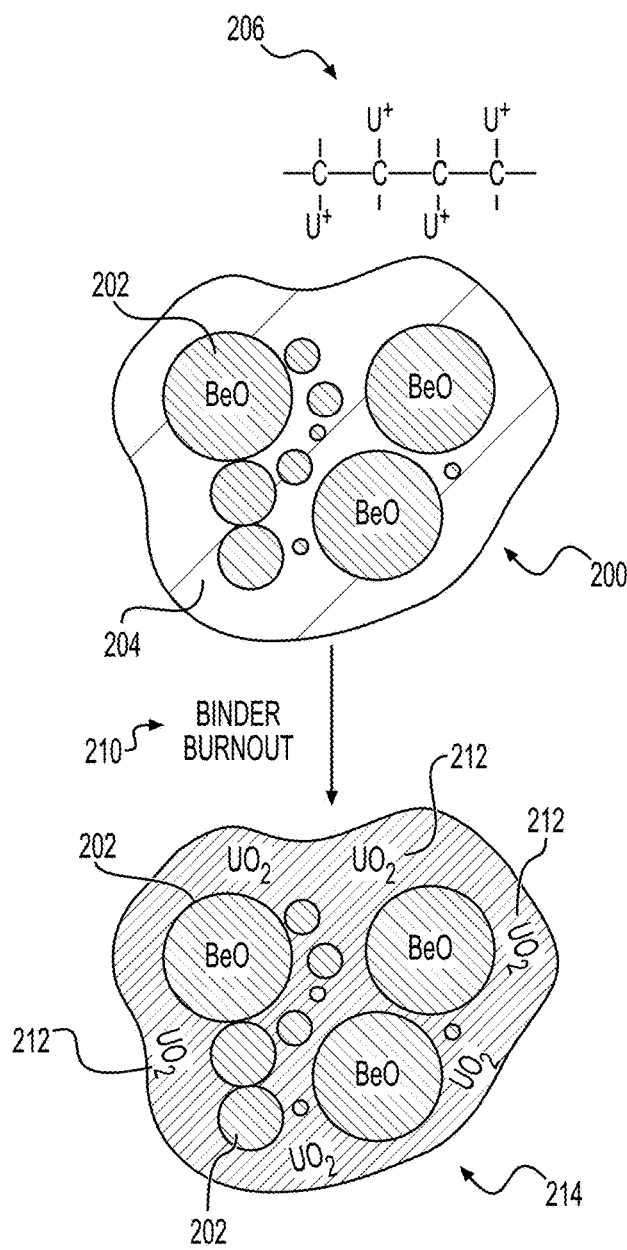
*FIG. 5A*  *FIG. 5B*

MODIFIED POLYMER DERIVED CERAMICS FOR ADDITIVE MANUFACTURING, ADDITIVE MANUFACTURING USING SAME, AND CERAMIC BODIES MANUFACTURED THEREBY

RELATED APPLICATION DATA

This application is based on and claims priority under 35 U.S.C. § 119 to U.S. Provisional Application No. 62/827,372, filed Apr. 1, 2019, the entire contents of which are incorporated herein by reference.

FIELD OF THE DISCLOSURE

The present disclosure relates to pre-ceramic particles, particle solutions and compositions, and in particular for manufacture into polymer derived ceramics (PDCs) via additive manufacturing, as well as to PDCs per se. The present disclosure also relates to methods for producing such pre-ceramic particles, particle solutions and compositions as well as methods to manufacture PDCs, in particular as it relates to components and structures for fission reactors.

BACKGROUND

In the discussion that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

Organometallic compounds and organic compounds incorporating metallic/metalloid species can be transformed into inorganic materials by a debinding process, such as thermal treatment under controlled atmosphere, can be used to produce ceramics, which are referred to as polymer-derived ceramics (PDCs). The configuration and microstructure of the preceramic polymer determine the composition, microstructure, and yield of the ceramic after debinding. For example, upon heat treatment (typically under inert atmosphere), PDCs pyrolyze into M(C,N,O) species (where M is the metallic/metalloid species) while volatile species (such as $CH_4$, $H_2$, $CO_2$, $H_2O$, and hydrocarbons) leave the material. FIG. 1 is an example flow diagram 1 for preparation and processing of PDCs, in which the major products and processing steps are indicated.

One example of PDC processing is Digital Light Projection (DLP) additive manufacturing (AM) of suitable resin compositions. Such resins 10 typically contain four main components: a particulate phase 12, a dispersant 14 for the particulate phase, an initiator/absorber 16 to initiate polymerization, and monomers 18, which are polymerized giving the organic phase which makes up the green body. FIG. 2 schematically depicts a resin 10 with these four main components. Typically, the monomer 18 is purely organic, which leads to large volume loss during subsequent debinding, such as by calcination/pyrolysis/sintering. For example, FIG. 3 shows a body manufactured by DLP AM using 37 vol. % $Zr_{0.07}Y_{0.03}O_2$ resin both before and after debinding. There is an approximate 30-40% loss (on a volume basis) between the pre-debinded body 20 and the debinded body 22. FIG. 4 is a microscope image showing cracks 30 that have formed in a debinded body having a lattice-like structure. These cracks 30 are due to stress induced by the shrinkage during debinding and sintering. Note how the cracks 30 are oriented in substantially the same direction in the debinded body, which direction is associated with the interface between successively deposited layers from the additive manufacturing process (hence leading to the term "interlayer cracking").

SUMMARY

Generally, Applicants have investigated compositions of polymer derived ceramics and their processing via additive manufacturing to form ceramic bodies. This has included varying the composition of a pre-ceramic particle solution (where a pre-ceramic particle solution is a monomer/oligomer/polymer-ceramic particle resin used for printing) to include the desired materials for the final ceramic, as well as altering the pre-ceramic particle solution to increase inorganic loading, increase manufacturing efficiencies, and reduce volume loss during debinding and defects. Such variations in the composition of the pre-ceramic particle solution and in additive manufacturing processes can be tailored to accommodate the materials used and the formed ceramic. For example, the compositions and processes disclosed herein allow for atomic level non-crystalline homogenous cation sources providing for increased control of chemical composition and an even distribution of cations in the polymer phase. Also for example, for nuclear applications, loading of fissionable material (both in the pre-ceramic particle solution and in the formed ceramic) can be selected to maintain non-criticality while also providing adequate containment over the lifetime of the manufactured component.

In general, a pre-ceramic particle solution can prepared by a Coordinated-PDC process, a Direct-PDC process or a Coordinated-Direct-PDC process, as those processes are further disclosed herein. In exemplary embodiments, a pre-ceramic particle solution comprise a polymer selected from the group consisting of (i) an organic polymer including a metal or metalloid cation, (ii) a first organometallic polymer and (iii) a second organometallic polymer including a metal or metalloid cation different from a metal in the second organometallic polymer, a plurality of particles selected from the group consisting of (a) a ceramic fuel particle and (b) a moderator particle, a dispersant, and a polymerization initiator.

The pre-ceramic particle solution can be supplied to an additive manufacturing process, such as digital light projection, and a structure can be made from the pre-ceramic particle solution by an additive manufacturing process. In exemplary embodiments, the structure (which is pre-ceramic particle green body) comprises a matrix of a polymer selected from the group consisting of (i) an organic polymer including a metal or metalloid cation functional group, (ii) an organometallic polymer and (iii) an organometallic polymer including a metal or metalloid cation functional group, and a plurality of particles selected from the group consisting of (a) a ceramic fuel particle and (b) a moderator particle, wherein the plurality of particles are contained with the matrix.

The structure (which is pre-ceramic particle green body) manufactured by additive manufacturing can then be debinded to form a polymer-derived ceramic sintered body. In exemplary embodiments, the polymer-derived ceramic sintered body comprises a matrix of (1) sintered metal or metalloid from an organic polymer including the metal or metalloid as a cation functional group or (2) sintered metal or metalloid from an organometallic polymer, and a plurality of particles selected from the group consisting of (a) a ceramic fuel particle and (b) a moderator particle, wherein the plurality of particles are contained with the matrix Unless otherwise stated, as used herein, metallic means anything not organic and includes the metals and metalloids of the Periodic Table.

Unless otherwise stated, as used herein, organometallic chemistry includes: organolithium chemistry, organoberyllium chemistry, organoborane chemistry (Period 2 elements); organomagnesium chemistry, organoaluminum chemistry, organosilicon chemistry (Period 3 elements); organotitanium chemistry, organochromium chemistry, organomanganese chemistry organoiron chemistry, organocobalt chemistry organonickel chemistry, organocopper chemistry, organozinc chemistry, organogallium chemistry, organogermanium chemistry (Period 4 elements); organoruthenium chemistry, organopalladium chemistry, organosilver chemistry, organocadmium chemistry, organoindium chemistry, organotin chemistry (Period 5 elements); organolanthanide chemistry, organoosmium chemistry, organoiridium chemistry, organoplatinum chemistry, organogold chemistry, organomercury chemistry, organothallium chemistry, organolead chemistry (Period 6 elements); and organouranium chemistry (Period 7 elements).

All values used in the discussion of embodiments herein are reported as nominal (whether or not that term is used in the text) and all values in examples and tests are reported as actual.

BRIEF DESCRIPTION OF THE DRAWING

The following detailed description of preferred embodiments can be read in connection with the accompanying drawings in which like numerals designate like elements and in which:

FIGS. 5A and 5B schematically illustrate a debinding process for Coordinated-PDC.

DETAILED DESCRIPTION

Figure 1:
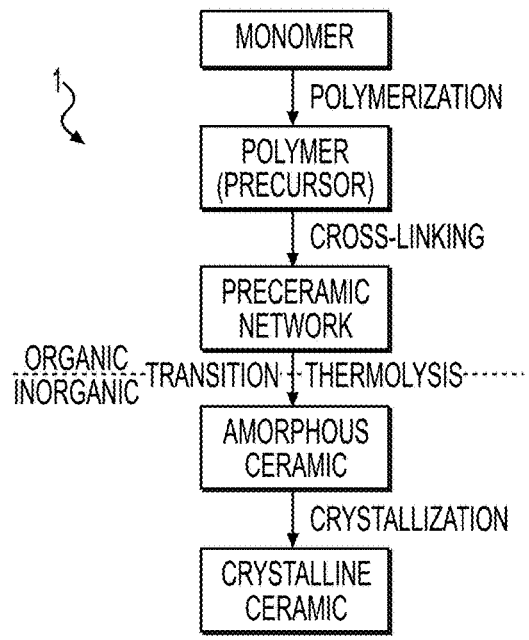
FIG. 1 is an example flow diagram for preparation and processing of PDCs.
Figure 2:
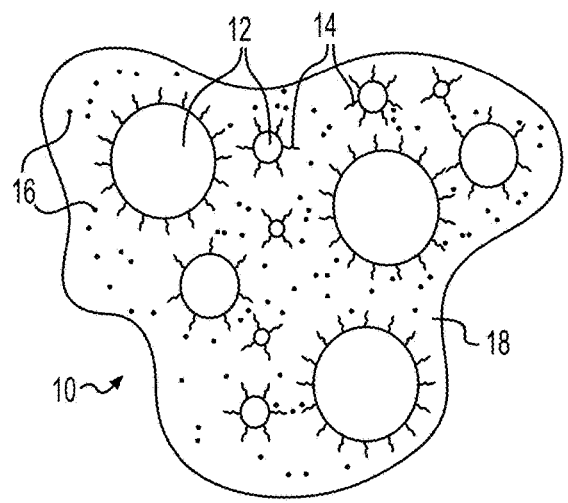
FIG. 2 schematically depicts a resin with the four main components of a particulate phase, a dispersant, an initiator, and monomers.

Generally, while the disclosed polymer derived ceramics are prepared from a pre-ceramic particle solution, the composition of the solution can vary (with attendant variation in the mechanisms that form the green body and the ultimate ceramic component). The various variations are disclosed and discussed below.

In a first embodiment (also called herein Coordinated-PDC), the disclosed polymer derived ceramics are based on an organic polymer that includes a metal or metalloid cation, which is represented by the following chemical structure (Formula 1):

(Formula 1)

In the representative chemical structure of Formula 1, the organic-based polymer is represented by the —C—C— structure and the metal or metalloid cation is represented by the $M^+$ structure. The organic-based polymer can be any suitable organic-based polymer that can be loaded with a desired particulate phase to a sufficient loading to produce a desired component while still being capable of being processed by additive manufacturing. The metal or metalloid cation can be any metal or metalloid of the Periodic Table. It should be noted that a particular particulate phase may have a range of organic-based polymers that can be satisfactorily paired for this purpose. In certain embodiments, the organic-based polymer is an aliphatic polymer; alternatively, the organic-based polymer is selected from the group consisting of an alkane, an alkene, an alkyne, and mixtures thereof. In certain embodiments, the metal or metalloid cation is selected from the group consisting of Si, Ti, Be, B, U, Hf, Zr, Nb, and Gd and mixtures thereof. In general, the metal or metalloid cation can be introduced to solution and then be driven to coordinate with the organic-based polymer. The cation source could vary and the method to coordinate it to the organic-based polymer will vary.

In certain embodiments, the desired particulate phase is comprised of ceramic fuel particles having a composition, for example, including uranium oxide (which may be enriched, for example to less than 20% enrichment, although in other embodiments higher enrichments up to 100% may be used), uranium with 10 wt. % molybdenum (U-10Mo) (although other U/Mo ratios may also be used), uranium nitride (UN), or other stable fissionable fuel compounds. In other embodiments, the desired particulate phase is comprised of ceramic particles having a composition, for example, including Be, BeO, or other moderator material.

Solutions with organic polymers that include a metal or metalloid cation are processed by additive manufacturing to form a green body and subsequently debinded, such as by pyrolizing/calcining/sintering. In the debinding process, organic species—in particular carbonaceous species—will become gaseous while inorganic species, such as metal or metalloid cations (as well as the non-carbonaceous components of any particulate phase loaded into the pre-ceramic particle solution) will remain and undergo further chemical conversion, such as carburization, nitrification, or oxidation. Thus, debinding results in a ceramic form of the cations.

FIGS. 5A and 5B schematically illustrate such a debinding process for Coordinated-PDC. In each of FIGS. 5A and 5B, a pre-ceramic particle solution 100, 200 is prepared by placing a ceramic particle, such as a ceramic particle of $UO_2$ 102 or a ceramic particle of BeO 202, into a solution phase 104,204 of an organic polymer that includes a metal or metalloid cation, such as poly ethylene glycol acrylates with a metal cation of $U^+$ shown at 106, 206. Implementing the coordinated PDC process can homogenously distribute the cationic species in-between the ceramic particles by operation of the transparent polymer phase in the pre-ceramic particle solution 100, 200. During subsequent binder burn-out 110,210, such as by pyrolysis, the organic phase of the organic polymer 106,206 will evaporate. However, the cationic species 112,212 will remain (typically as a ceramic, such as a carbide, nitride or oxide (depending on, for example, the conditions under which binder burnout occurs)) leading to an increase in ceramic mass in the as-formed ceramic body 114,214 by the presence of such metal carbide, nitride or oxide (M(C,N,O)) species.

The Coordinated-PDC process can increase the amount of cation species in the as-formed ceramic body upon decomposition in the debinding process. For example, consider the organic polymer is ethylene glycol diacrylate with a molecular mass of 62 g/mol, in a 55 vol. % ceramic particle solution, with the balance being the organic polymer. Assuming a 1:1 OH-functional group to cation ratio in the organic polymer that includes a metal or metalloid cation, the effective "ceramic volume loading" could theoretically increase by ~25 vol. %. In other examples, if the desired total solid loading target for the solution is 50 vol. % loading, than the ceramic particle loading may only be, for example, 25 vol. %, while the balance of the ceramic material could be formed in debinding using the metal or metalloid cation species from the coordinated PDC monomer. Utilizing the ceramic volume loading in the solution phase of the pre-ceramic particle solution allows for a reduction in ceramic particle loading with attendant increase in light penetration during the additive manufacturing process and thus is particularly effective in cases of highly scattering or absorbing ceramic species. Accordingly, a ceramic with increased loading of fissionable material could be additively manufactured with increased efficiencies, for example, speed of manufacturing a desired article by additive manufacturing.

Although FIG. 5A shows an example with like cation species, i.e., $UO_2$, other examples can use mixed cation species and mixed ceramics as shown in FIG. 5B. Also, although in some embodiments the ceramic particle includes fissionable material, such as the $UO_2$ ceramic particle 102 shown in the FIG. 5A example, in other embodiments the ceramic particle includes moderator species, such as the BeO ceramic particle 204 shown in FIG. 5B. For example, the use of BeO ceramic particles in the pre-ceramic particle solution makes it significantly easier to use print-based additive manufacturing techniques due to the overall lower refractive index of BeO.

The $UO_2$—$UO_2$ polymer derived ceramic presented in FIG. 5A may be incorporated into a fast reactor application or, with the addition of secondary moderator elements, may be incorporated into a thermal reactor application. The BeO—$UO_2$ polymer derived ceramic presented in FIG. 5B may be incorporated directly into a thermal reactor application. Moreover, a 70/30 BeO/$UO_2$ pre-ceramic particle solution could be processed by additive manufacturing methods without using any solid ceramic fuel particles to result in an as-formed polymer derived ceramic that is sufficient to achieve criticality with only thermal neutrons.

In a second embodiment (also called herein Direct-PDC), the disclosed polymer derived ceramics are based on an organometallic polymer in which the elements on the backbone of the polymer structure (which would include carbon in an organic polymer structure) are replaced with a metal or metalloid element. An organometallic polymer is represented by the following chemical structure (Formula 2):

(Formula 2)

In the representative chemical structure of Formula 2, the organometallic-based polymer is represented by the -M-M- structure, where M is the metal or metalloid. The organometallic polymer can have an organometallic backbone (M-N or M-C) or be completely metallic (M-M) (as shown in Formula 2) and nitrification or carburization can happen during the debinding environment. In each case, shrinkage derived from organic vaporization should be minimized as a result of the utilization of the direct PDC in an additive manufacturing system. The organometallic-based polymer can be any suitable organometallic-based polymer that can be loaded with a desired particulate phase to a sufficient loading to produce a desired component while still being capable of being processed by additive manufacturing. The metal or metalloid in the organometallic-based polymer can be any metal or metalloid of the Periodic Table. Example metals and metalloids include Si, Ge, Sn, P, B, and S. It should be noted that a particular particulate phase may have a range of organometallic-based polymers that can be satisfactorily paired for this purpose.

In certain embodiments of Direct-PDC, the metal and metalloid is silicon-based, examples of which include silicon carbide (SiC), silicon carbonitride (SiCN) and silicon nitride, all of which have sufficiently high melting points to allow for high temperature phase stability of the as-formed polymer derived ceramic structure. In other embodiments of Direct-PDC, the metal and metalloid is boron based. In still further embodiments, the metal and metalloid is a mixture, such as Si and B. Other example organometallic-based polymers include: polysilazanes for derivation of SiN matrix; polycarbosilanesfor derivation of SiC matrix; polysiloxanesfor derivation of SiO matrix; polysilanefor derivation of Si coatings (which can then be nitride, oxided, or carbided); polyborosilanes for derivation of a Si/B matrix; and polyborazylenes or polyaminoboranes for derivation of a BN matrix. Silicon-based polymer-derived ceramics are advantageous in that they do not need post-processing for coating development.

Solutions with organometallic-based polymers are processed by additive manufacturing to form a green body and subsequently debinded, such as by pyrolyzing/calcining/sintering. In the debinding process, organic species—in particular carbonaceous species—will become gaseous while organometallic species, such as the metal or metalloid along the backbone of the organometallic polymer (as well as the non-carbonaceous components of any particulate phase loaded into the pre-ceramic particle solution) will remain and undergo further chemical conversion, such as carburization, nitrification, or oxidation. Thus, debinding results in a metallic/intermetallic/ceramic form of the organometallic species, depending on the conditions of the debinding process.

Figure 6:
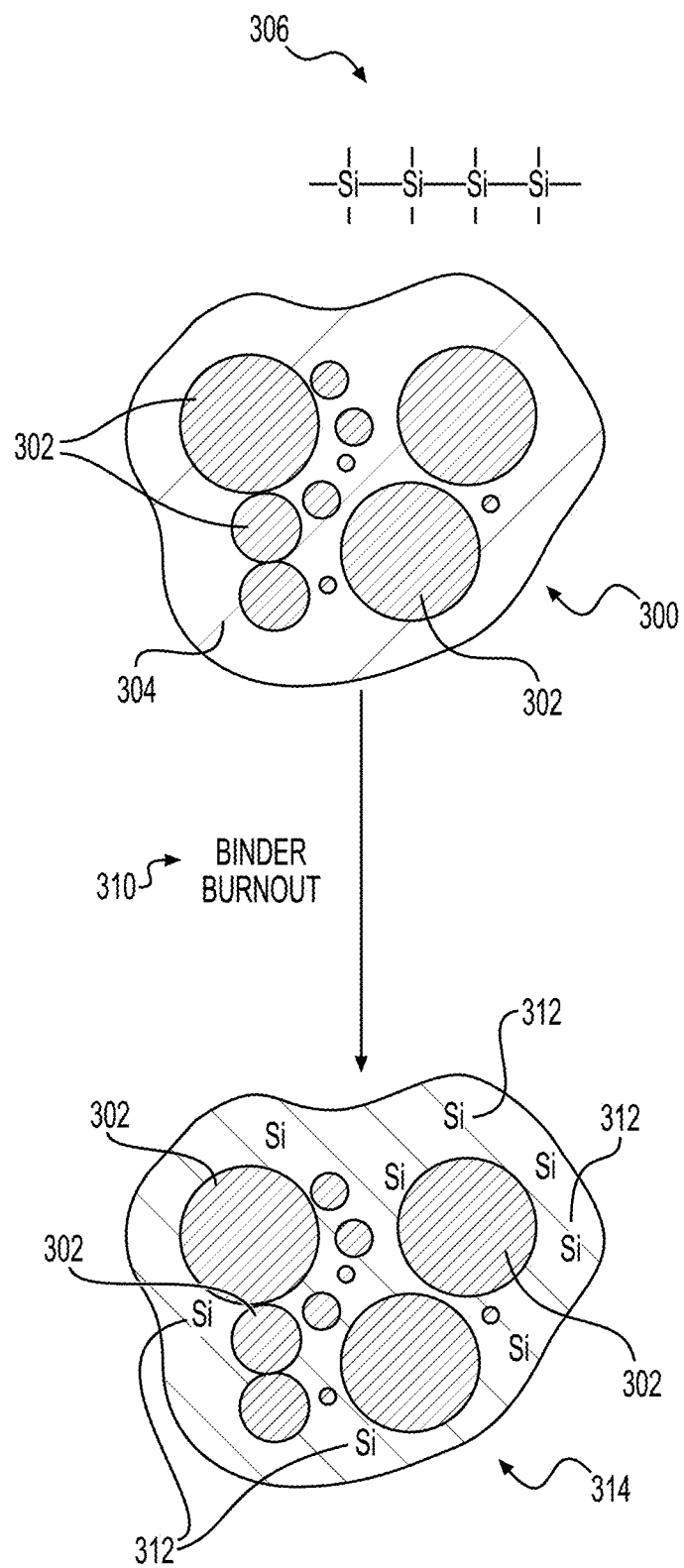
FIG. 6 schematically illustrates a debinding process for Direct-PDC.

FIG. 6 schematically illustrates such a debinding process for Direct-PDC. In FIG. 6, a pre-ceramic particle solution 300 is prepared by placing a ceramic particle 302, such as a ceramic fuel particle including fissionable material such as $UO_2$ or a ceramic moderator particle including a moderator material such as BeO, into a solution phase 304 of an organometallic-based polymer, such as polysilane shown at 306. Implementing the Direct-PDC process can homogenously distribute the metal or metalloid from the organometallic polymer in-between the ceramic particles by operation of the transparent polymer phase in the pre-ceramic particle solution 300. During subsequent binder burnout 310, such as by pyrolysis, the organic phase of the organometallic-based polymer 306 will evaporate. However, the metal or metalloid 312 from the organometallic polymer will remain (typically as a metal or metalloid or a ceramic, such as a carbide, nitride or oxide of a metal or metalloid (depending on, for example, the conditions under which binder burnout occurs)) leading to an increase in ceramic mass in the as-formed ceramic body 314 by the presence of such metal or metalloid or metal carbide, nitride or oxide (M(C,N,O)) species. In exemplary embodiments, the Direct-PDC process produces an as-formed, polymer-derived ceramic in which the ceramic fuel particles are completely surround by a metal or metalloid phase, such as $UO_2$ surrounded by a Si phase.

The Direct-PDC process can provide significant increases in metal or metalloid content derived from the polymer phase. This allows for an increase in the effective "ceramic volume loading" of the green body leading to less shrinkage of the final desired ceramic form. The Direct-PDC process can also allow the realization of a coating around all the ceramic particles due to capillary forces. Additionally, direct PDC polymers tend to have high refractive indexes, which decrease refractive index mismatch between the monomer and ceramic particles, contributing to reduced scattering and increased penetration depth. Application wise this could lead to a fully encapsulated fuel source, which would decrease (or even eliminate) fuel loss during direct flow NTP applications.

A third embodiment combines aspects of Coordinated-PDC and Direct-PDC (also called herein Coordinated-Direct-PDC). In particular, in Coordinated-Direct-PDC, an organometallic-based polymer (in which the elements on the backbone of the polymer structure (which would include carbon in an organic polymer structure) are replaced with a metal or metalloid element) also includes a metal or metalloid cation. An organometallic-based polymer that also includes a metal or metalloid cation is represented by the following chemical structure (Formula 3):

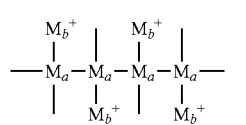

(Formula 3)

In the representative chemical structure of Formula 3, the organometallic-based polymer is represented by the $-M_a-M_a-$ structure, where $M_a$ is the metal or metalloid. The organometallic-based polymer can have an organometallic backbone ($M_a$-N or $M_a$-C) or be completely metallic ($M_a$-$M_a$) (as shown in Formula 3) and nitrification or carburization can happen during the debinding environment. In addition, in the representative chemical structure of Formula 3, the metal or metalloid cation is represented by the $M_b^+$ structure. The metal or metalloid cation ($M_b^+$) can be any metal or metalloid of the Periodic Table and the organometallic-based polymer can be any suitable organometallic-based polymer that can be loaded with a desired particulate phase to a sufficient loading to produce a desired component while still being capable of being processed by additive manufacturing. The metal or metalloid in the organometallic-based polymer can be any metal or metalloid of the Periodic Table. Example metals and metalloids in the organometallic-based polymer include Si, Ge, Sn, P, B, and S. Furthermore, the metal or metalloid ($M_a$) in the organometallic-based polymer can be the same or different from the metal or metalloid cation ($M_b^+$).

While combining the Coordinated-PDC process with the Direct-PDC process can lead to a chemically different coating, for example $Si_xTi_yC_z$ or $Si_xTi_yN_z$ or MAX phases not achievable by conventional deposition techniques, it should still be noted that a particular particulate phase may have a range of organometallic-based polymers/metal or metalloid cations that can be satisfactorily paired and achieve suitable loading in the Coordinated-Direct-PDC process for both additive manufacture and adequate properties in the as-formed polymer-derived ceramic structure.

Figure 7:
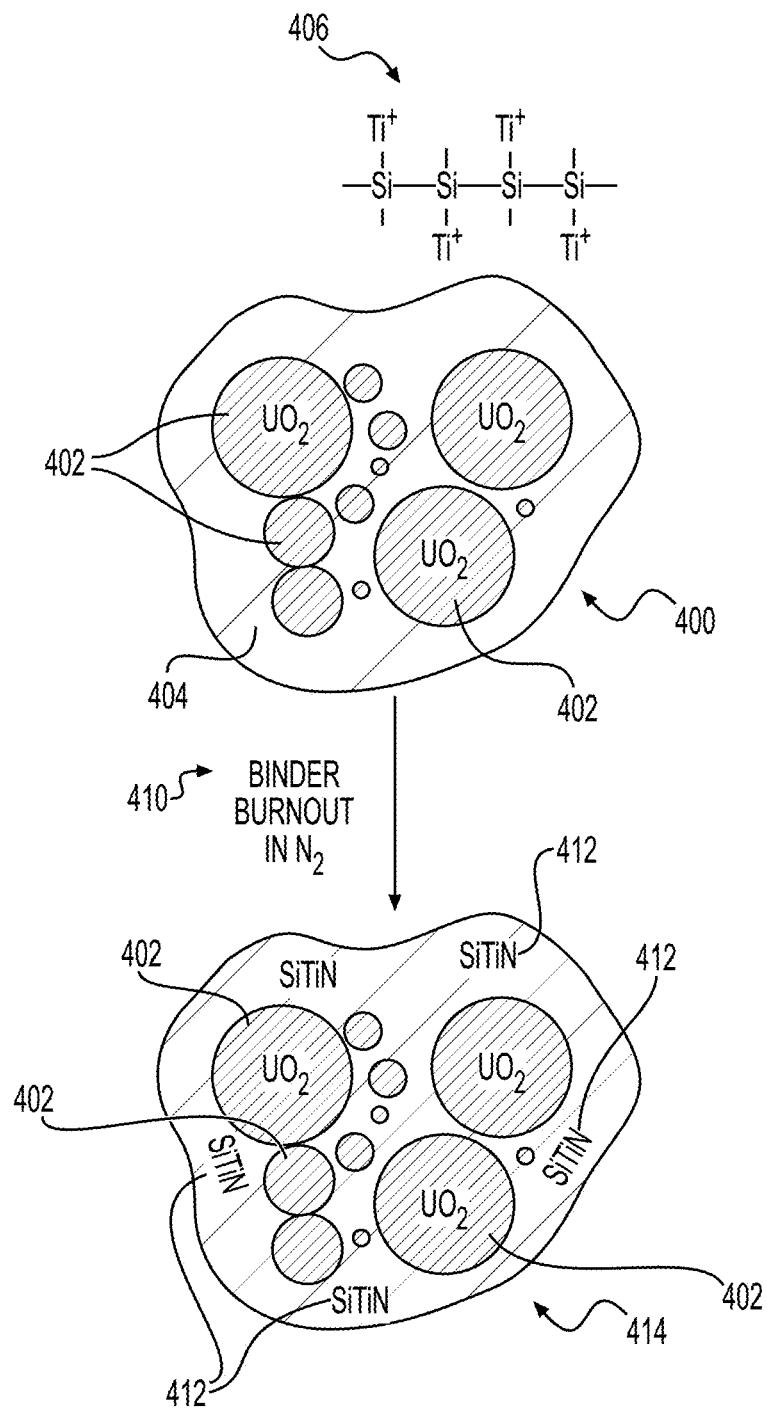
FIG. 7 schematically illustrates a debinding process for the Coordinated-Direct-PDC process.

FIG. 7 schematically illustrates such a debinding process for the Coordinated-Direct-PDC process. In FIG. 7, a pre-ceramic particle solution 400 is prepared by placing a ceramic particle 402, such as a ceramic fuel particle including fissionable material such as $UO_2$ or a ceramic moderator particle including a moderator material such as BeO, into a solution phase 404 of an organometallic-based polymer with metal or metal cations, such as $Ti^+$-polysilane shown at 406. Implementing the Coordinated-Direct-PDC process can homogenously distribute both the metal or metalloid ($M_a$) from the organometallic-based polymer and the metal or metalloid cation ($M_b^+$) in-between the ceramic particles by operation of the transparent polymer phase in the pre-ceramic particle solution 400. During subsequent binder burnout 410, such as by pyrolysis, the organic phase of the organometallic-based polymer 406 will evaporate. However, both the metal or metalloid ($M_a$) from the organometallic-based polymer and the metal or metalloid cation ($M_b^+$) 412 will remain (typically as a metal or metalloid or a ceramic, such as a carbide, nitride or oxide of a metal or metalloid (depending on, for example, the conditions under which binder burnout occurs) or as a tertiary compound like $Si_xTi_yC_z$ or $Si_xTi_yN_z$ or MAX phases depending on the metal or metalloid and the conditions under which binder burnout occurs) leading to an increase in ceramic mass in the as-formed ceramic body 414 by the presence of such metal or metalloid or metal carbide, nitride or oxide (M(C,N,O)) species. In exemplary embodiments, the Coordinated-Direct-PDC process produces an as-formed, polymer-derived ceramic in which the ceramic fuel particles are completely surround by a metal or metalloid phase, such as $UO_2$ surrounded by a $Si_xTi_yN_z$ phase.

The Coordinated-Direct-PDC process can achieve many of the same benefits and advantages discussed herein for the Direct-PDC process. But in the Coordinated-Direct-PDC process, you have the additionally ability manufacture coatings and chemical compositions which are not ordinarily thermodynamically possible due to the low diffusion pathways and atomic level mixing. Application wise this allows for complex ceramic coatings, such as SiTiN or SiTiC, that have better physical properties than just SiC/SiN for high performance NTP applications.

The composition of the matrix-particle composite of the as-formed ceramic body, such as any of as-formed ceramic body 114, 214, 314, 414, is a consolidation of the ceramic particles 102, 202, 302, 402 and the metal or metalloid 112, 212, 312, 412 (regardless of whether introduced from the polymer backbone or from a cationic species). The degree of similarity of the chemical composition of the ceramic particles and the metal or metalloid influences the microstructure of the as-formed ceramic body. In a first instance, if the metal or metalloid is substantially equivalent compositionally to that of the ceramic particles, a consolidated single phase with a complex microstructure will be observed. An example of the first instance is the formation of $UO_2$ fuel forms where a lower particulate volume loading can be used to increase light penetration. In a second instance, if the metal or metalloid is compositionally different from that of the ceramic particles, and chemical compatibility to form a composite is low, a consolidated multi-phase material with a complex microstructure will be observed. An example of the second instance is formation of a $BeO/UO_2$ composite, where the $UO_2$ fuel is primarily derived from the polymeric phase. In a third instance, if the metal or metalloid is compositionally different from that of the ceramic particles, but there is chemical compatibility to form a composite, either a new phase will be formed or doping of the original particle phase will be observed. The third instance allows one to dope or influence the ceramic phase, or synthesize a completely different compound. Examples of the third instance include (a) for doping: the addition of 0.5 mol. % of $Gd_2O_3$ or $Nd_2O_5$ can be incorporated into $UO_2$ during the additive process from a coordinated PDC process and would alter the electronic and thermal transport properties of $UO_2$, and (b) for synthesis: $U_3Si_5$ could be printed by using ceramic particles of $U_3Si_5$ or by using metal uranium particles with a polysilane monomer. During sintering, the uranium metal would react with the silicon to form $U_3Si_5$. This would allow for a higher wt. % loading of $U_3Si_5$ in the green body, than if you printed it directly.

Figure 3:
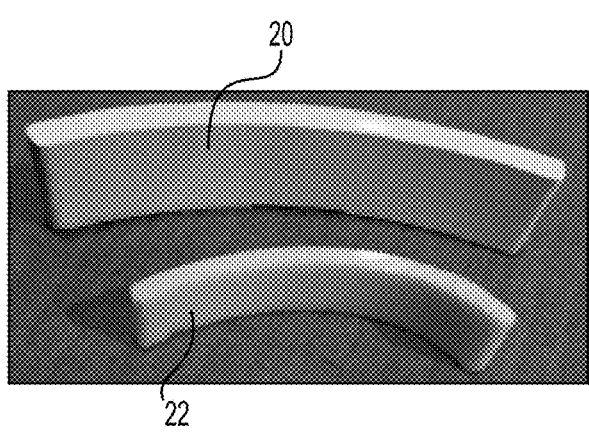
FIG. 3 shows a first body manufactured by DLP AM using 37 vol. % $Zr_{0.97}Y_{0.03}O_2$ resin both before and after debinding.
Figure 4:
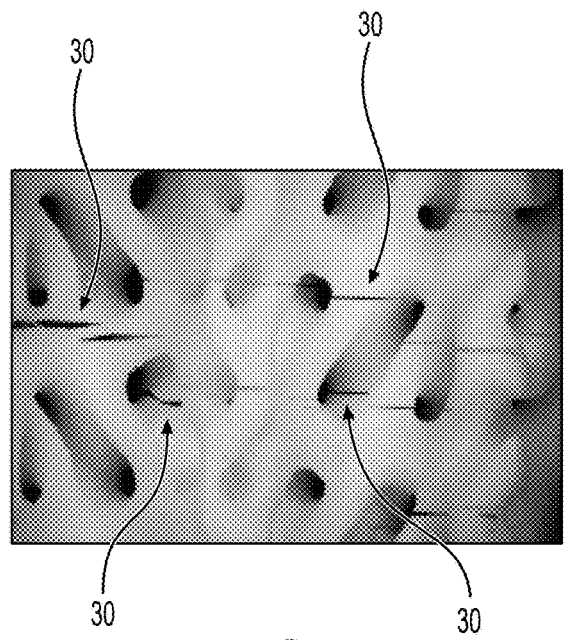
FIG. 4 is a microscope image of a portion of a debinded and sintered second body and shows interlayer cracking that has occurred due to stress induced by the shrinkage during debinding and sintering.

In some embodiments, the compositions, structures and methods disclosed herein relate to improving the additive manufacturing process, in particular by improving the cure depth of the light-dependent additive manufacturing techniques and/or by improving the vol. % of green body which becomes a ceramic. Digital Light Projection (DLP) Additive Manufacturing (AM) is one example of a light-dependent additive manufacturing process that is suitable for the compositions and structures disclosed herein. The DLP process is a type of lithography process and is fundamentally limited by the interaction of light with the loaded pre-ceramic particle solution. In the loaded pre-ceramic particle solution, the depth at which light is available to cause photopolymerization can be limited by absorption associated with the ceramic particles as well as by the refractive index mismatch between the polymer phase and the particulate phase which contributes to scattering of the light. For pre-ceramic particle solutions containing fissionable compositions such as $UO_2$, this is particularly challenging as $UO_2$ has both a high absorption cross-section as well as a high refractive index mismatch with organic polymers. Sensitivity of the slurry to light is given by $D_p$:

$$D_p^{-1} = \phi S + (1-\phi) A_{liquid} + \phi A_{solid} \quad \text{(Equation 1)}$$

where $D_p$=cure depth sensitivity, S=scattering, $\phi$=volume fraction solids, $A_{liquid}$=UV absorption liquids, and $A_{solid}$=UV absorption solids. As $D_p$ is inversely proportional to loading of ceramic particles ($\phi$), the lower the loading ($\phi$) the better the penetration of the light. However, such lower loading leads to higher shrinkage leading to increased part failure (see FIGS. 3 and 4 and related discussion). Advantageously, the use of Coordinated-PDC processes, Direct-PDC processes, and Coordinated-Direct-PDC processes mitigate both absorption and scattering effects by allowing for a reduction in the number of absorbing and scattering centers by reducing particulate loading, but retain sinterability by deriving a ceramic phase from the transparent liquid monomer. For example, to obtain a 50% total loading, the uranium oxide particular loading can be reduced down to 25% and one can derive the other 25% by including sufficient uranium species to the monomer; upon debinding, the combination would provide a ~50% total loading in the end product, which is enough to prevent shrinkage cracks. The increased loading due to the monomer phase can also indirectly increase cure depth if it enables a decrease in the particulate phase (and therefore a decrease in light interactions with the particles).

In other aspects, the compositions, structures and methods disclosed herein relate to the preparation of characteristics of the feedstock of the ceramic phase. As noted above with respect to Equation 1, cure depth sensitivity is inversely proportional to the UV absorption of the ceramic particle present in the pre-ceramic particle solution. This absorption is related to the crystalline bonding structure and, by correlation, the electronic band structure. Also as noted above, to cure depth sensitivity is also related scattering and absorption characteristics in the pre-ceramic particle solution.

Accordingly, in certain embodiments, the crystalline and electronic structure of the ceramic component of the pre-ceramic particle solution can be altered by decreasing the crystallinity, or to increase the amorphous character. In one approach, constituents of the polymer and/or the ceramic particle can be selected to alter the crystal structure to be more amorphous. For example, the O/U ratio in $UO_2$ can be increased resulting in a decrease in absorption by ~20%. In another approach applicable to Coordinated-PDC processes and Coordinated-Direct-PDC processes, the amorphous character of the uranium oxide resulting from the metal or metalloid cation can be controlled by suitable control of the processing temperature during the debinding process. For example, during the Coordinated-PDC processes and Coordinated-Direct-PDC processes, there is a temperature regime with a lower temperature bound above which all the carbon species have decomposed, but below an upper temperature bound above which long range crystallization of the ceramic occurs. At temperatures between the lower temperature bound and the upper temperature bound, the non-ceramic particle component of the pre-ceramic particle solution, i.e., the portion that forms based on the metal or metalloid in the polymer component, is in the non-crystalline state (i.e., has less than 10 vol. % crystalline character, alternatively less than 5 vol. % crystalline character). While the lower temperature bound and the upper temperature bound are material specific, an example temperature interval for these bounds is from ~500° C. to ~1000° C., alternatively, a lower bound of 500° C. or 600° C. or 700° C. to an upper bound of 825° C. or 850° C. or 875° C. The non-crystalline character is determined by x-ray diffraction crystallography.

Because of its amorphous characteristics, using amorphous material as the source for the ceramic particle in any of the Coordinated-PDC processes, Direct-PDC processes, and Coordinated-Direct-PDC processes can contribute to altering the interaction of light with the ceramic phase due to the lack of a long-range crystalline structure and can reduce scattering and increase $D_p$.

Figure 8:
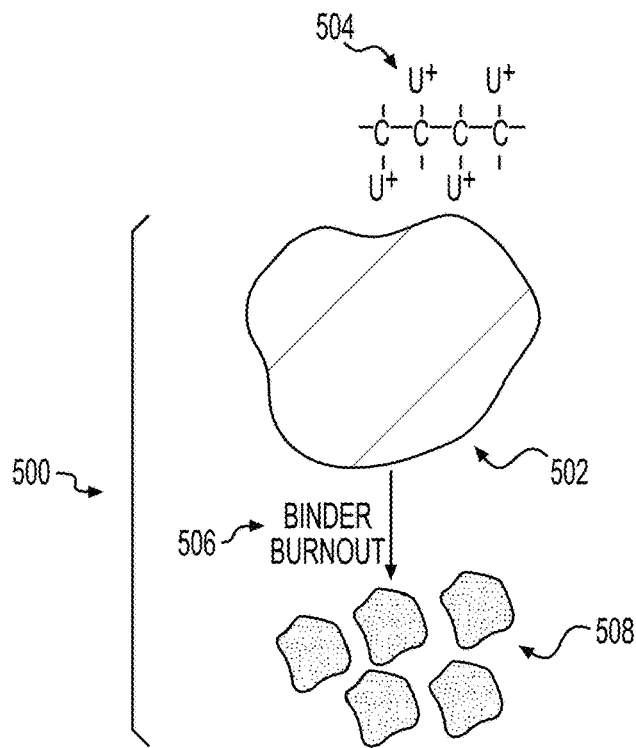
FIG. 8 is a schematic illustration of a Coordinated-PDC process used to form amorphous ceramic particles for x-ray diffraction analysis.
Figure 9:
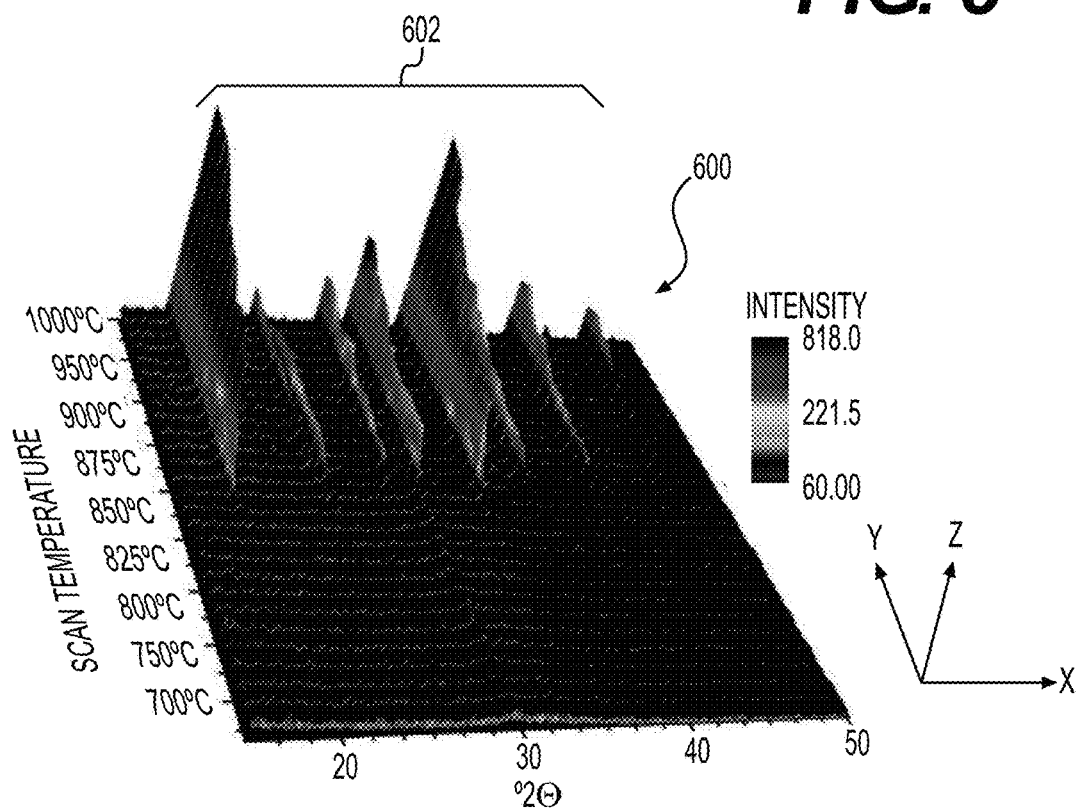
FIG. 9 is a graph showing the results of high temperature X-ray diffraction analysis on a uranium oxide sample.

To investigate the formation of amorphous ceramic particles, particularly of fissionable fuel material such as uranium oxide via a PDC process, a sample of uranium oxide surrogate was prepared in a Coordinated-PDC process 500 as schematically illustrated in FIG. 8 (discussed below) and then formed into a powder for the x-ray diffraction analysis. FIG. 9 shows the results of high temperature X-ray diffraction on a sample of uranium oxide surrogate.

In the Coordinated-PDC process 500 of FIG. 8, a pre-ceramic solution 502 was prepared by forming a solution phase of an organic polymer that includes a surrogate of a metal cation of $U^+$ (as shown at 504). In this sample, the surrogate of a metal cation of $U^+$ was aluminum. The coordinated PDC process homogenously distributes the cationic species throughout the pre-ceramic solution 502. Subsequent binder burnout 506, such as by pyrolysis, occurred at 550° C., which (as shown by the results of high temperature X-ray diffraction testing shown in FIG. 9) is between the temperature above which all the carbonaceous species have decomposed (i.e., above ~500° C.), but before the temperature at which long range crystallization of the ceramic occurs (i.e., ~1000° C.) where an amorphous material exists. The sample was formed into powder 508 for subsequent x-ray diffraction analysis.

In FIG. 9, the results of high temperature X-ray diffraction are shown in a landscape plot 600, in which the x-ray diffraction intensity (Z-axis; ranging from 60.00 to 818.0 a.u.) is plotted as a function of scan temperature (Y-axis; ranging from 700° C. to 1000° C.) and scan angle (2θ) (X-axis; ranging from 25 degrees to 50 degrees 2θ). In the high temperature x-ray diffraction testing, the amorphous PDC sample temperature was increased (y-axis) while characterization of the crystal structure (x/z-axis) was performed dynamically. As seen in FIG. 9, x-ray diffraction intensity at temperatures less than about 825° C. to 850° C. for all values of 2θ ranging from 25 degrees to 50 degrees 2θ are negligible and demonstrate the amorphous nature of the PDC powder 508. Starting at about 850° C., x-ray diffraction peaks 502 begin to appear and, as temperature increases to 1000° C., the x-ray diffraction intensity increases from the baseline 60 a.u. to a maximum of 818 a.u., indicating the phase has crystallized. Note: no chemical change was performed as a function of temperature, only an increase in energy occurred to catalyze crystallization.

In another approach to reduce the interaction effects between the ceramic particles loaded into the pre-ceramic particle solution and the light used to react the polymer in the additive manufacturing process, the surface of the ceramic particles can be altered.

Figure 10:
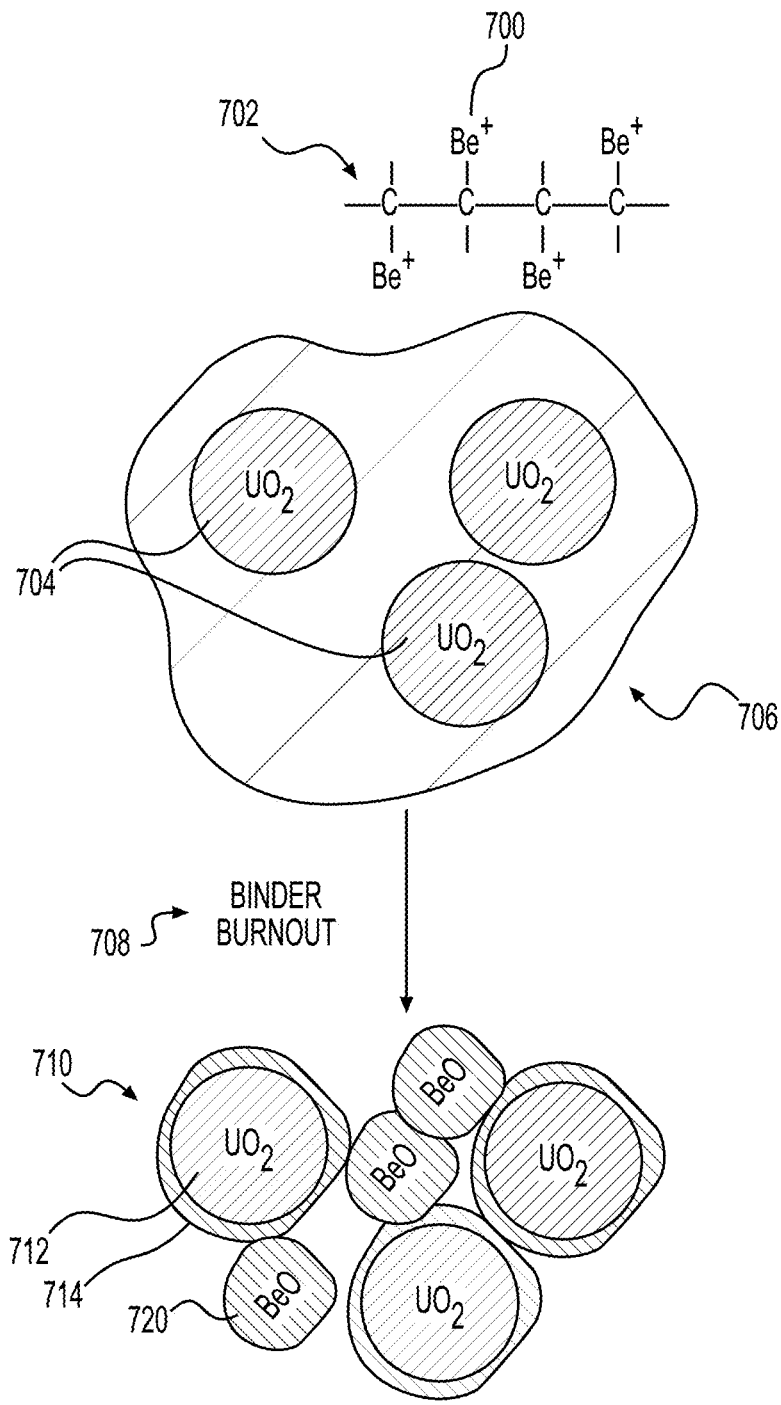
FIG. 10 schematically illustrates a Coordinated-PDC synthesis process used to coat ceramic particles.

In a first embodiment and as schematically illustrated in FIG. 10, the metal or metalloid cation 700 present in the polymer 702 used in the Coordinated-PDC synthesis process and the Coordinated-Direct-PDC synthesis process can coat ceramic particles 704, such as ceramic fuel particles, in a pre-ceramic solution 706. Typically, the ceramic fuel particles will be loaded into a liquid phase and surface tension causes the ceramic fuel particles to be surrounded by the liquid phase. After binder burnout 708, such as calcination, the multi-phase mixture can be increased in temperature by which the polymer derived ceramic will undergo light tack sintering, at low temperatures ~800-1000° C., ensuring the coated particles 710 are hard agglomerates vs soft agglomerates. The resulting coated particles 710 have a core region 712 corresponding to the ceramic particulate phase 704 and a coated region 714 corresponding to the metal or metalloid cation 700. Additional regions or particles 720 corresponding to the metal or metalloid cation 700 (but not associated with a coating of the ceramic particulate phase 704) can also be present and can be tailored to the matrix composition of the as-formed ceramic body. When the coated particles 710 are used in additive manufacturing and exposed to light, the light will predominantly interact with the coated region 714 altering the scattering and absorption behavior and increasing the cure depth sensitivity.

Figure 11:
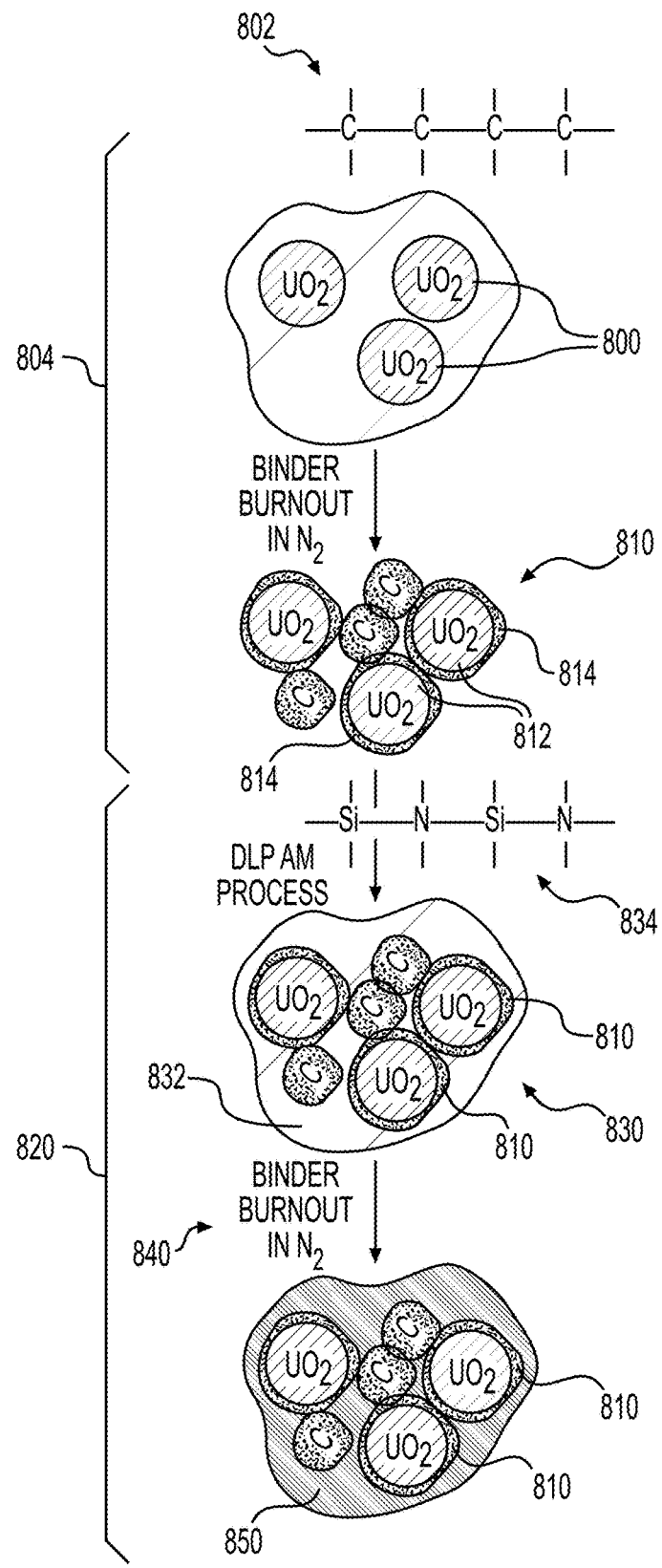
FIG. 11 schematically illustrates a Coordinated-PDC synthesis process modified to coat ceramic particulates in carbonaceous layers and then further process by PDC techniques.

In a second embodiment and as schematically illustrated in FIG. 11, the process as shown and described in regard to FIG. 10 can be modified to coat ceramic particulates in carbonaceous layers and then further processed by PDC techniques described herein to form a ceramic structure similar to tristructural isotropic (TRISO) fuel particles. TRISO fuel particles are a type of micro fuel particle consisting of a central fuel kernel composed of $UO_X$ (or sometimes UC or UCO) coated with layers of isotropic materials including a porous buffer layer made of carbon, followed by a dense inner layer of pyrolytic carbon (PyC), followed by a ceramic layer of SiC to retain fission products at elevated temperatures and to give the TRISO particle more structural integrity, followed by a dense outer layer of PyC. Here and as shown in FIG. 11, a ceramic fuel particle 800 can be coated with carbon or carbon based material originating from an organic polymer 802 in a first PDC process 804 to produce a carbon coated ceramic fuel particle 810. The carbon coated ceramic fuel particle 810 have a core region 812 corresponding to the ceramic fuel particle 800 and a coated region 814 corresponding to the organic component of the organic polymer 802. Additional regions or particles 820 corresponding to the organic component of the organic polymer 802 (but not associated with a coating of the ceramic fuel particle 800) can also be present and can be tailored to the matrix composition of the as-formed ceramic body. When the carbon coated ceramic fuel particle 810 are exposed to light in a further additive manufacturing process (such as the second PDC process 820 in FIG. 11), the light will predominantly interact with the coated region 814 altering the scattering and absorption behavior and increasing the cure depth sensitivity The carbon coated ceramic fuel particle 810 from the first PDC process 804 is further processed in second PDC process 820. This second PDC process 820 can be any suitable PDC process, including the Coordinated-PDC processes, Direct-PDC processes, and Coordinated-Direct-PDC processes disclosed herein. In FIG. 11, an example of a Direct-PDC process is schematically illustrated. A pre-ceramic particle solution 830 is prepared by placing the carbon coated ceramic fuel particle 810 from the first PDC process 804 into a solution phase 832 of an organometallic-based polymer, in this case an organosilicon polymer, such as polysilane shown at 834. Implementing the Direct-PDC process can homogenously distribute the metal or metalloid from the organometallic polymer in-between the ceramic particles by operation of the transparent polymer phase in the pre-ceramic particle solution 830. During subsequent binder burnout 840, such as by pyrolysis, the organic phase of the organometallic-based polymer 834 will evaporate and the metal or metalloid from the organometallic-based polymer 834 will remain (typically as a metal or metalloid or a ceramic, such as a carbide, nitride or oxide of a metal or metalloid (depending on, for example, the conditions under which binder burnout occurs)). Binder burnout 840 can also occur in a controlled atmosphere, such as nitrogen. In the example illustrated in FIG. 11, binder burnout in nitrogen of polysilane results in a SiNC ceramic matrix 850 that forms a coating completely surrounding the carbon coated ceramic fuel particle 810. Such a ceramic matrix 850 completely surrounding a carbon coated ceramic fuel particle 810 can function as cladding to the carbon coated ceramic fuel particle 810.

The above PDC processes, including the Coordinated-PDC processes, Direct-PDC processes, and Coordinated-Direct-PDC processes, have each derived a coating (based on the metal and metalloid species/cations present in the pre-ceramic particle solution) as a matrix surrounding the ceramic particles, which matrix is intrinsically formed as a part of the DLP AM process. However, polymer-derived ceramic coatings can also be directly applied to surfaces of structures made by other additive manufacturing processes (or even by non-additive manufacturing process). By decoupling the additive manufacturing process for the ceramic particle from the manufacturing process of the polymer-derived ceramic coating, one is able to use different compositions for these two components than are available in a combined PDC additive manufacturing process. For example, such decoupling would allow for a bulk skeleton with compositional differences from the coating that may be useful for neutron applications. Furthermore, if decoupled, alternatives to photoactive polymers may be useful to incorporate into the processing methods, such as sol-gel chemistry techniques (though multiple coating steps may be needed to obtain a cohesive coating due to the intrinsically low cation content of solutions in the sol-gel process). In another alternative, inorganic/organometallic polymers could be utilized and are attractive choices for high temperature applications due to the temperature stability of such coatings, such as SiC and SiN. For example, silane-based chemistry, such as that disclosed in connection with Direct-PDC process, can be used to create the coated region. The benefit of this process over a sol-gel process is that it may only take one coating due to the increased metal content, but is limited organometallic based polymer chemistries (Si, Ge, etc.)

Figure 12:
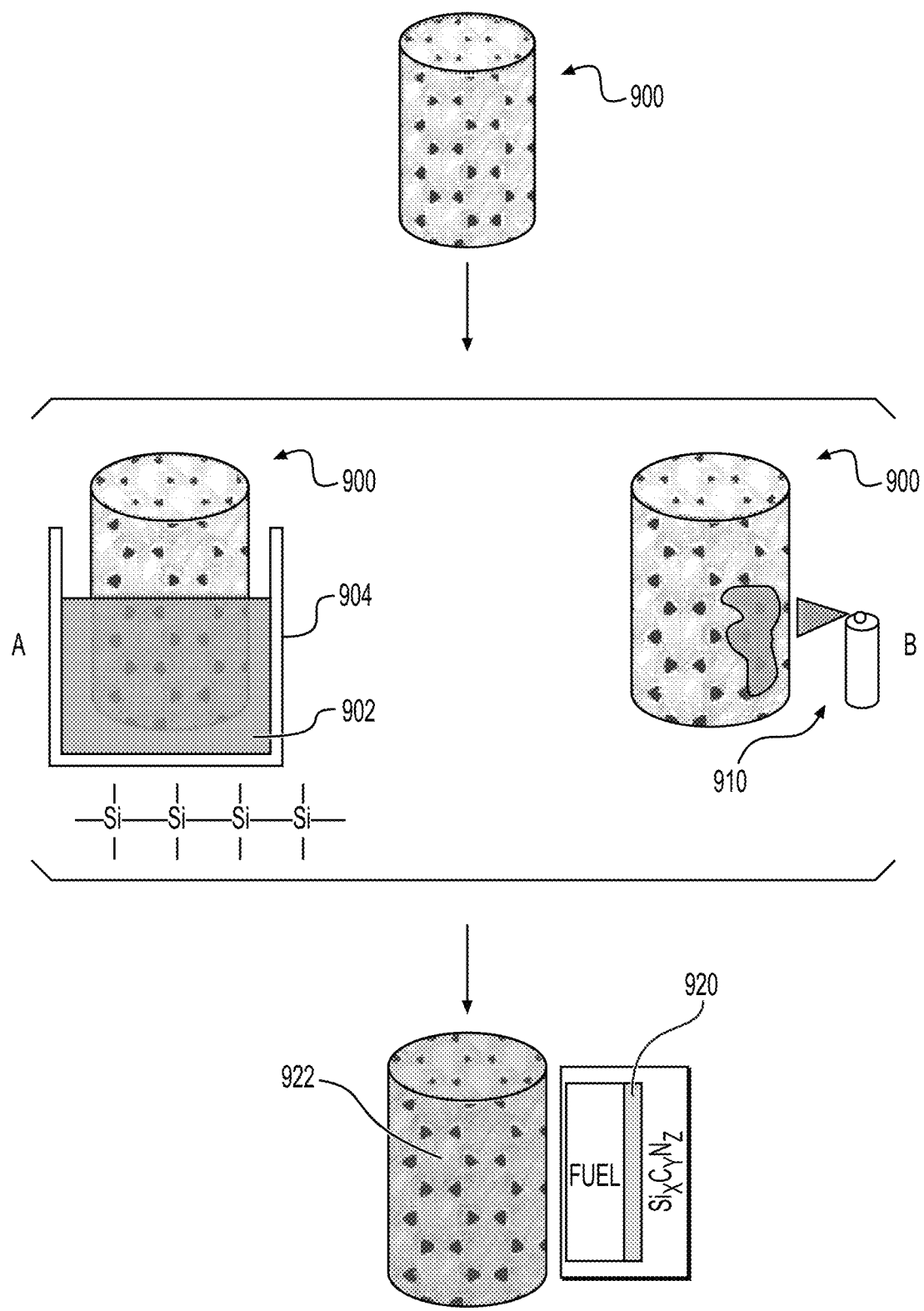
FIG. 12 schematically illustrates process steps for the direct application of PDC coatings without the use of photoactive polymers in the additive manufacturing process.

FIG. 12 schematically illustrates process steps for the direct application of PDC coatings without the use of photoactive polymers in the additive manufacturing process. Starting from a formed body 900 (which may be any suitable formed body and be either in the form of a green-body or a consolidated, sintered body), a pre-ceramic particle solution 902 is applied to the surfaces of the formed body 900. In one technique (shown at A in FIG. 12), the pre-ceramic particle solution forms a bath 904 and the formed body 900 (or part thereof) is submerged in the bath 904 for a time sufficient for the pre-ceramic particle solution 902 to penetrate and contact the desired surfaces of the formed body 900 to be coated. For complex parts, this may require a soaking time and/or can be assisted by the application of vacuum or pressurization. In another technique (shown at B in FIG. 12), the pre-ceramic particle solution 904 can be applied to the surface of the formed body 900 (or part thereof) by any suitable application technique, such as by the spray coating technique 910 shown at B in FIG. 12. The composition of the pre-ceramic particle solution 902 can be any chemistry disclosed herein, including those consistent with Formulas 1, 2 and 3. In addition, the composition of the pre-ceramic particle solution 902 can also include particulates, such as metals, oxides, or carbon fiber.

Other suitable coating techniques include thermally initiated polymerization, UV initiated polymerization, electron beam (EBeam) initiated polymerization, rheological stabilization, solution dehydration, physical vapor deposition, or any techniques Regardless of technique, multiple coatings of the pre-ceramic particle solution 902 may be applied to build up a sufficient coating thickness to form a continuous coherent coating 920 on the coated formed body 922. Sufficient coating thickness range from 10 μm to 50 μm per layer, and a total layer thickness of greater than 150 μm, alternatively up to 2 mm.

Figure 13A:
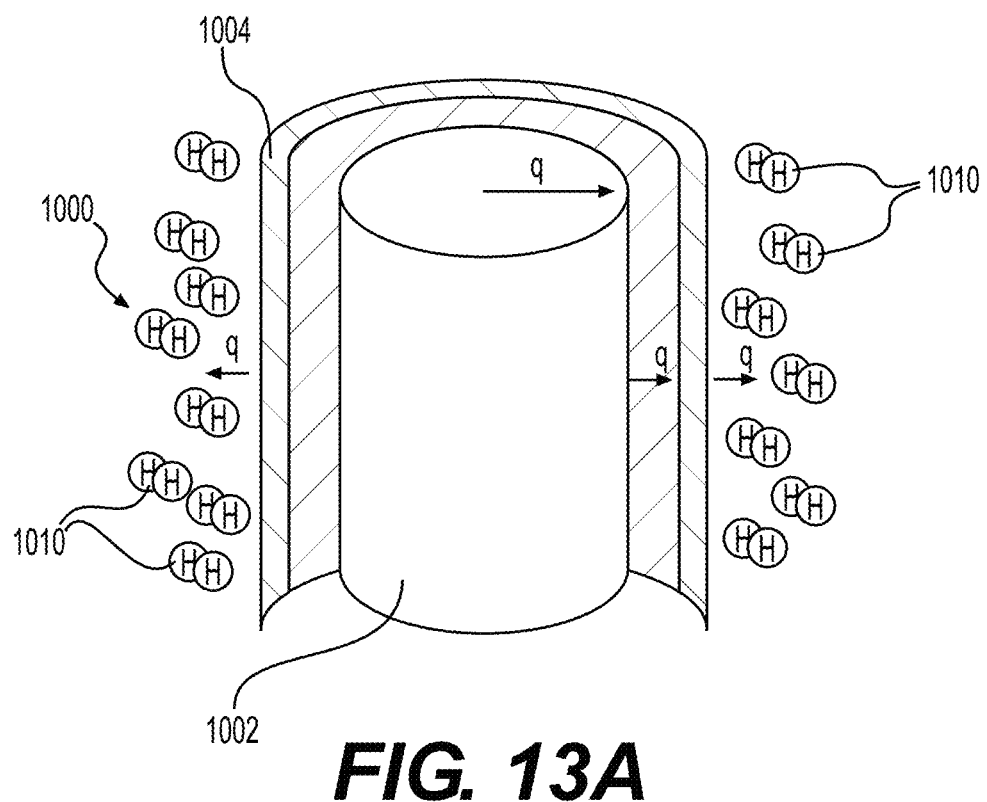
FIG. 13A is a schematic drawing of a nuclear thermal propulsion (NTP) reactor and FIG. 13B is a schematic drawing of a direct flow over lattice fuel reactor design.
Figure 13B:
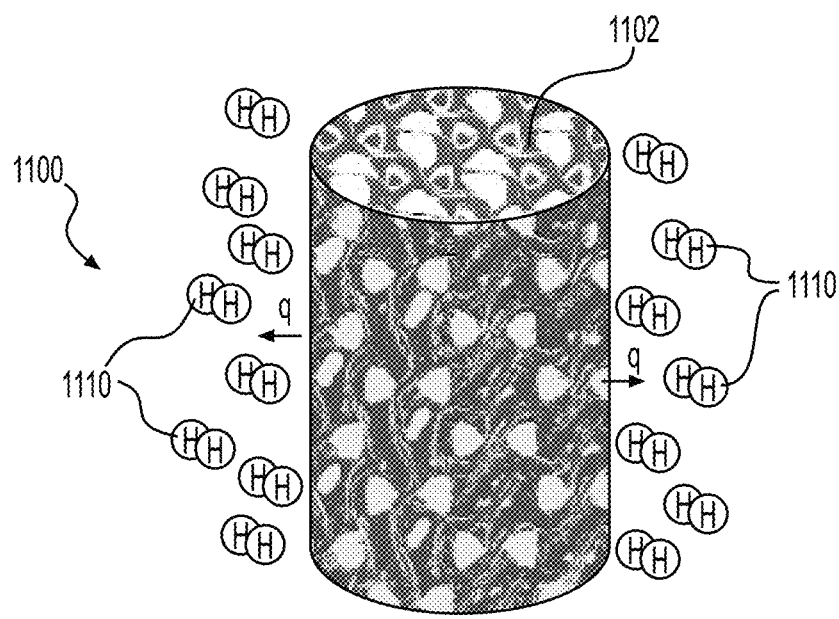

After coating, the coated formed body 922 goes through a debinding and sintering process to consolidate the coating 920. Such processes can also convert constituents of the coating through carburization, nitrification, or oxidation reactions Although discussed herein with regard to a general "body" or "structure", the compositions, structures and methods disclosed herein are particularly suitable for nuclear power applications, in particular for nuclear thermal propulsion (NTP) reactors and direct flow reactors. FIG. 13A is a schematic drawing of an example NTP reactor 1000 with the fuel 1002 in perspective view and the cladding 1004 in cross-sectional perspective view. The efficiency of the NTP reactor is driven by the ultimate temperature of the hydrogen gas 1010 on exit, which is maximized by minimizing the heat gradient between the hydrogen gas 1010 and the center of the fuel 1002. FIG. 13B is a schematic drawing of an example direct flow over lattice fuel design NTP reactor in which a continuous matrix of a nuclear fuel composition forms a lattice 1100. The efficiency of the Direct Flow NTP reactor is also driven by the ultimate temperature of the hydrogen gas 1110 on exit, which is maximized by minimizing the heat gradient between the hydrogen gas 1110 and the center of the fuel 1102. In contrast to the NTP Reactor in FIG. 13A, the direct flow process represented in FIG. 13B eliminates the heat flow to the cladding and from the cladding to the gas, making the design more efficient. Further, the nuclear fuel ligament size is generally smaller in the direct flow NTP design, leading to lower centerline fuel temperatures and increasing margins before fuel melting.

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to fissionable fuel materials, nuclear reactors, and associated components, the principles, compositions and processes described herein can also apply to other materials, other compositions, and other structures as well as to their manufacture.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A pre-ceramic particle solution, comprising:
an organic polymer of Formula 1:

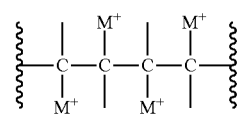

(Formula 1)

wherein M⁺ is a metal or metalloid cation functional group selected from the group consisting of Si, Ti, Be, B, U, Hf, Zr, Nb, and Gd and mixtures thereof;
a plurality of fuel particles;
a dispersant; and
a polymerization initiator,
wherein the plurality of fuel particles have a composition including a fissionable material.

2. The pre-ceramic particle solution according to claim 1, wherein M⁺ is selected from the group consisting of Ti, Be, U, Nb, and Gd and mixtures thereof.

3. The pre-ceramic particle solution according to claim 1, wherein the fissionable material is uranium oxide, uranium with 10 wt. % molybdenum, or uranium nitride.

4. The pre-ceramic particle solution according to claim 1, wherein the fissionable material is enriched uranium oxide.

5. The pre-ceramic particle solution according to claim 1, wherein the polymerization initiator is a photoinitiator.

6. The pre-ceramic particle solution according to claim 5, wherein the photoinitiator is a UV photoinitiator or an EBeam initiated photoinitiator.

7. The pre-ceramic particle solution according to claim 1, wherein the metal or metalloid cation is U.

8. The pre-ceramic particle solution according to claim 1, wherein the metal or metalloid cation is Ti.

9. The pre-ceramic particle solution according to claim 1, wherein the metal or metalloid cation is Be.

10. The pre-ceramic particle solution according to claim 1, further comprising a plurality of moderator particles having a composition including beryllium or carbon or mixtures thereof.

11. A pre-ceramic particle green body, comprising:
a matrix of an organic polymer of Formula 1:

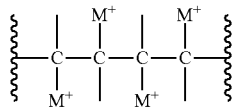

(Formula 1)

wherein M⁺ is a metal or metalloid cation functional group selected from the group consisting of Si, Ti, Be, B, U, Hf, Zr, Nb, and Gd and mixtures thereof; and
a plurality of fuel particles,
wherein the plurality of fuel particles are contained within the matrix, and
wherein the plurality of fuel particles have a composition including a fissionable material.

12. The pre-ceramic particle green body according to claim 11, wherein M⁺ is selected from the group consisting of Ti, Be, U, Nb, and Gd and mixtures thereof.

13. The pre-ceramic particle green body according to claim 11, wherein the fissionable material is uranium oxide, uranium with 10 wt. % molybdenum, or uranium nitride.

14. The pre-ceramic particle green body according to claim 11, wherein the fissionable material is enriched uranium oxide.

15. The pre-ceramic particle solution according to claim 11, wherein the metal or metalloid cation is U.

16. The pre-ceramic particle solution according to claim 11, wherein the metal or metalloid cation is Ti.

17. The pre-ceramic particle solution according to claim 11, wherein the metal or metalloid cation is Be.

18. The pre-ceramic particle green body according to claim 11, further comprising a plurality of moderator particles,
wherein the plurality of moderator particles are contained within the matrix, and
wherein the plurality of moderator particles have a composition including beryllium or carbon or mixtures thereof.

19. A polymer-derived ceramic sintered body formed by debinding the pre-ceramic particle green body of claim 11, wherein the polymer-derived ceramic sintered body includes:
a matrix of sintered metal or metalloid from the organic polymer including the metal or metalloid as a cation functional group; and
the plurality of fuel particles contained within the matrix.

20. The polymer-derived ceramic sintered body according to claim 19, wherein M⁺ is selected from the group consisting of Ti, Be, U, Nb, and Gd and mixtures thereof.

21. The polymer-derived ceramic sintered body according to claim 19, wherein the fissionable material is uranium oxide, uranium with 10 wt. % molybdenum, or uranium nitride.

22. The polymer-derived ceramic sintered body according to claim 19, wherein the fissionable material is enriched uranium oxide.

23. The polymer-derived ceramic sintered body according to claim 19, wherein the metal or metalloid cation is U.

24. The polymer-derived ceramic sintered body according to claim 19, wherein the metal or metalloid cation is Ti.

25. The polymer-derived ceramic sintered body according to claim 19, wherein the metal or metalloid cation is Be.

26. A polymer-derived ceramic sintered body formed by debinding the pre-ceramic particle green body of claim 18, wherein the polymer-derived ceramic sintered body includes:
a matrix of sintered metal or metalloid from the organic polymer including the metal or metalloid as a cation functional group;
the plurality of fuel particles contained within the matrix; and
the plurality of moderator particles contained within the matrix.

* * * * *